Figure 2:
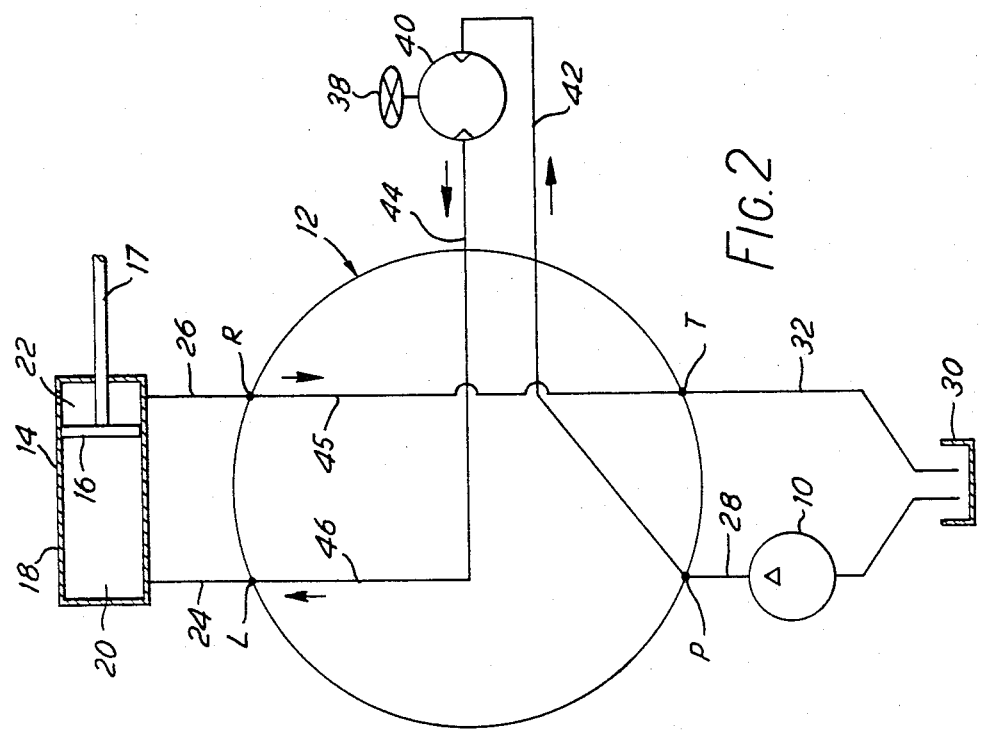

United States Patent [19]

Pedersen

[11] Patent Number: 4,532,764
[45] Date of Patent: Aug. 6, 1985

[54] REACTION TYPE HYDRAULIC STEERING CONTROL UNIT

[75] Inventor: Poul H. H. Pedersen, Nordborg, Denmark

[73] Assignee: Danfoss A/S, Nordborg, Denmark

[21] Appl. No.: 456,426

[22] Filed: Jan. 7, 1983

[51] Int. Cl.³ .............................................. F15B 15/18
[52] U.S. Cl. ........................................ 60/384; 60/386; 60/475
[58] Field of Search .......................... 60/384, 386, 475; 180/132

[56] References Cited

U.S. PATENT DOCUMENTS

| | | | |
|---|---|---|---|
| 3,564,848 | 2/1971 | Baatrup et al. | 60/384 |
| 3,636,708 | 1/1972 | Karman et al. | 60/475 |
| 4,144,947 | 3/1979 | Withers et al. | 180/132 |
| 4,432,270 | 2/1984 | Kyster et al. | 60/384 |
| 4,462,209 | 7/1984 | Thomsen et al. | 60/384 |

FOREIGN PATENT DOCUMENTS 1441166 6/1976 United Kingdom ................ 180/132

*Primary Examiner*—Robert E. Garrett
*Assistant Examiner*—John M. Husar
*Attorney, Agent, or Firm*—Wayne B. Easton

[57] ABSTRACT

The invention relates to a reaction hydraulic control unit for use in steering systems of the type having a differential type servomotor. In steering systems of this type having a differential piston type servomotor there exists a condition during the piston centering operation when the unit is in neutral wherein the servomotor piston has a slower centering speed when the transfer of medium is from the nonrod side to the rod side of the servomotor. The unequal centering times causes annoyance to drivers because that condition is transmitted to the steering wheel. This problem is addressed by providing steering controlled valving for exhausting fluid from the nonrod chamber of the servomotor to the system tank after the control unit has returned to its neutral position and during the centering operation of the servomotor piston.

2 Claims, 4 Drawing Figures

REACTION TYPE HYDRAULIC STEERING CONTROL UNIT

The invention relates to a reaction type hydraulic control unit for use in steering systems of the type having a differential type servomotor.

In steering systems of this type a steering wheel actuated control unit controls the flow of pressurized fluid from a pump to a servomotor and the exhausting of fluid therefrom to a tank. In its neutral position the control unit is normally connected to both sides of the servomotor so as to allow the vehicle wheels to move the servomotor piston back to its centered neutral position. In its left and right turn operating positions the control unit connects the pump to one side of the servomotor and connects the other side of the servomotor to a tank.

A control unit of this type is disclosed in U.S. Pat. Re. No. 25,126. It comprises an inner rotary slide connected to steering wheel and an outer follower type rotary slide connected to a metering motor which determines the quantity of pressure medium flowing to the servomotor. The two rotary slide sleeves are relatively displaceable to a limited extent and together form a reversing valve which is held in a neutral position by springs disposed between the sleeves. If an open center type unit is used, control apertures in the slide sleeves open a short-circuiting path between the pump and the tank for operation in a neutral position. Upon relative rotation between the slide sleeves in one direction or the other, this short-circuiting path is closed to provide communication to orifices which allow the pressure medium to flow from the pump through the metering motor to the one side of the servomotor and from the other side thereof back to the tank, or conversely.

In prior steering systems of the above-type having a differential piston type servomotor, such as in U.S. Pat. No. 3,971,214, there exists a condition during the piston centering operation wherein the piston has a slower centering speed when the transfer of medium is from the nonrod side to the rod side of the servomotor. The slower speed is due to flow impedance by reason of the rod side not having sufficient capacity to accommodate all of the medium from the nonrod side. The excess medium from the nonrod side is disposed of by leakage through the system wherein it encounters a relatively high flow impedance. The transfer of medium during centering from the rod side to the nonrod side, on the other hand, does not encounter any appreciable flow resistance because the nonrod side has the larger capacity which allows all of the medium from the rod side to be accommodated.

The unequal centering times referred to above are sensed by the metering motor and it causes annoyance to the driver because that condition is transmitted by the metering motor to the steering wheel.

This problem is solved in accordance with present invention by providing new and improved means for exhausting fluid from the servomotor after the control unit has returned to its neutral position and during the centering operation of the servomotor piston.

A main object of the invention is to provide a new and improved hydraulic control unit for use in steering systems having differential servomotors.

Other objects of the invention will become apparent from the following specification, drawing and claims.

In the drawing

Figure 1:
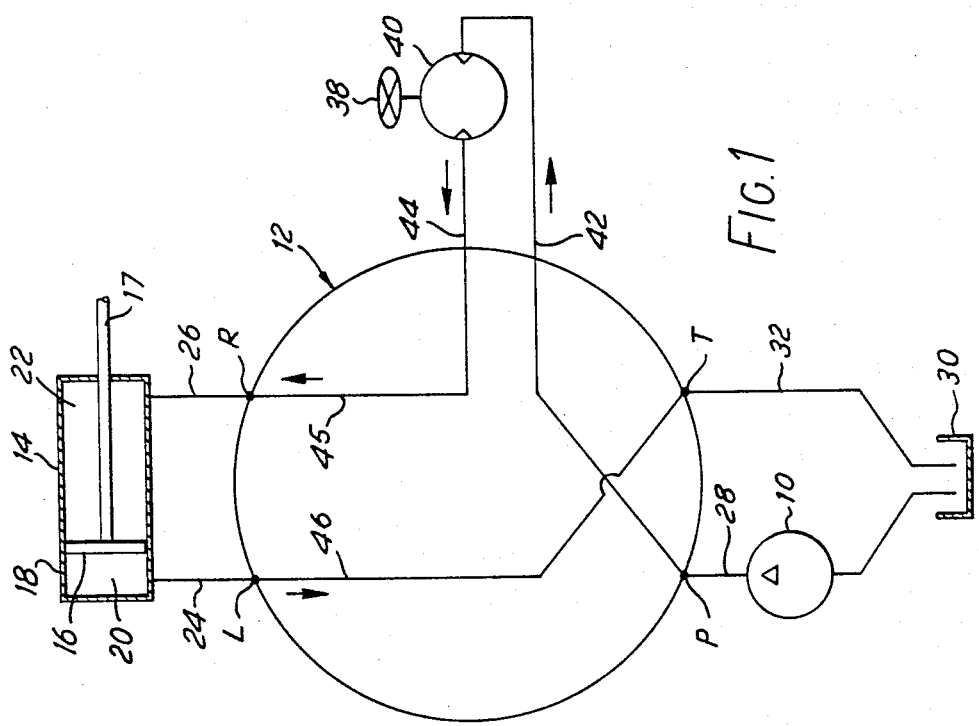
Figure 3:
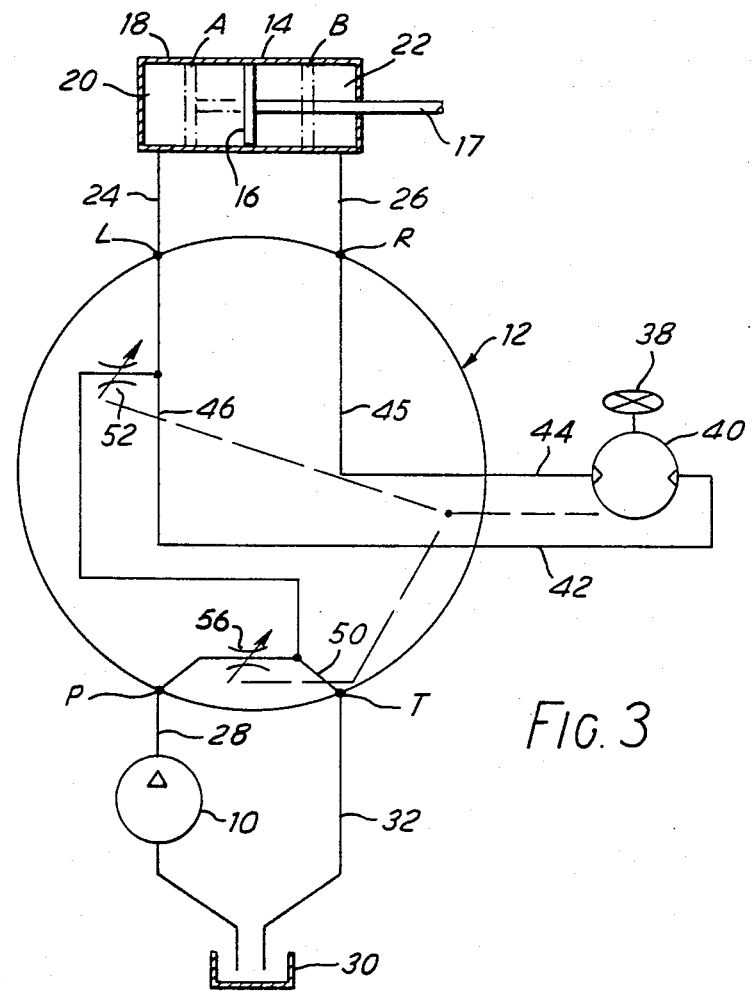
Figure 4:
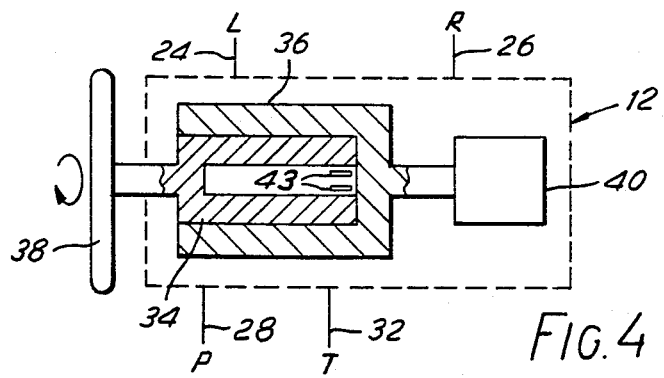

FIGS. 1 to 3 schematically illustrate three different settings of a steering control unit embodying invention installed in a steering system; and FIG. 4 schematically illustrates the construction of the steering control unit shown in FIGS. 1 to 3.

The steering control system illustrated in FIGS. 1 to 3 comprises a pressure medium supply means or pump 10, a tank, 30, a control unit 12 embodying the invention and a differential type servomotor 14. Servomotor 14 is of the differential type by reason of piston 16 having a piston rod 17 which extends from one side thereof. The piston and rod arrangement divides the cylinder 18 thereof into larger and smaller pressure area chambers 20 and 22. Rod 17 is connectable to a steering linkage which is not shown.

The larger chamber 20 is connected by a conduit 24 to the left connection L of the control unit 12 and the smaller operating chamber 22 is connected by way of a conduit 26 to the right connection R thereof. The connection P on the pressure side of the control unit 12 communicates by way of a conduit 28 with the pump 10. The connection T on the exhaust side of the unit 12 drains to tank 30 by way of a conduit 32.

The control unit 12 comprises relatively rotatable valve elements 34 and 36 as illustrated in FIG. 4 of which the valve element 34 is connected to a manual steering element 38 and the valve element 37 is connected to a metering motor 40. The two valve elements 34 and 36 are shown as rotary slides which are held in a neutral position relative to each other by several radially extending leaf springs 43. Slides 34 and 36 can turn relative to each other through a small predetermined angle against the force of these neutral position springs 43. The steering element 38 is turned by hand and the metering motor 40, which is traversed by the pressure medium flowing to the servomotor, 14, serves as a follow-up element.

FIG. 1 shows control unit 12 in a turn position which may be arbitrarily to the left or to the right but is illustrated as being to the left. With this setting pressurized fluid is being directed from pump 10 through a passage 42, metering motor 40, a passage 44, a passage 45 to connection R, and conduit 26 to the smaller servomotor chamber 22. Piston 16 is displaced to the left and fluid is drained from the larger servomotor chamber 20 through line 24, connection L, a passage 46, and through tank connection T to tank 30.

FIG. 2 shows control unit 12 in a turn position opposite to that of FIG. 1 which also may be arbitrarily to the left or the right but is illustrated as being to the right. With this setting pressurized fluid is directed from pump 10, through passage 42 and metering motor 40 to passage 44, passage 46 through connection L and conduit 24 to the servomotor chamber 20. Piston 16 moves to the right and fluid is drained from the smaller servomotor chamber 22 through line 26, connection R, passage 45 and through tank connection T to tank 30.

FIG. 3 shows control unit 12 in a neutral position. Control unit 12 is illustrated as having an open center type of construction as indicated in FIG. 3 but may as stated above have a closed center within the scope of the invention. In FIG. 3 the open center comprises a valve controlled bypass conduit 50 between the connections P and T. When valve elements 34 and 36 are in a relative neutral position there is a constant flow from pump 10 through bypass conduit 50 back to the tank 30 through line 32. When the valve elements 34 and 36 are moved out of their neutral position as indicated in FIGS. 1 and 2 by reason of the actuation of the steering wheel 38, a valve 56 in the bypass conduit 50 is closed to cause the bypass to be closed during that time.

At the end of a turning movement as illustrated in FIGS. 1 and 2, the steering wheel 38 may either be held in its new position or let go and allowed to be rotated back to its neutral position by reactionary or reverse forces acting on piston rod 17. If the steering wheel is let go of, the reverse forces effect a reverse movement of motor 40 and thus a reverse movement of steering wheel 38 by reason of piston 16 moving back to its centered position. It is the resulting compressing of the fluid in the contracting chambers 20 or 22 which causes a reverse flow of fluid through the motor 40.

When the piston 16 moves in a centering direction which causes the reduction of the smaller chamber 22, the flow is from chamber 22 through metering motor 40 to chamber 20 which expands at a faster rate than the reduction rate of chamber 22. Chamber 20 thus has the capacity to accommodate all of the medium discharged from chamber 22 and piston 16 does not experience any significant impedance to its centering motion.

When the piston 16 moves in a centering direction which causes the reduction of the larger chamber 20, the flow is from chamber 20 through metering motor 40 to the smaller chamber 22 which expands at a slower rate than the reduction rate of chamber 20. Chamber 22 thus does not have the capacity to accommodate all of the medium discharged from chamber 20 and the excess medium in prior art units is disposed of by leakage through the system. As the leakage is induced by the reduction of chamber 20 by piston 16 the piston encounters a significant impedance to its centering motion.

The different centering conditions following left and right turns is sensed by the metering motor 40 and it causes annoyance to the driver because the condition is transmitted from the metering motor to the steering wheel 38.

The present invention is directed to minimizing the excessive frictional resistance forces involved in draining chamber 20 by providing a direct route for draining the discharge of chamber 20 to the tank 30. This is accomplished by the construction illustrated in FIG. 3 wherein a variable throttle 52 is provided between the two valve elements 34 and 36 which connects the control unit connection L directly to tank 30 via the control unit connection T. In the neutral position of valve elements 34 and 36 the open or closed condition of throttle valve 52 depends on the setting of valve elements 34 and 36.

During turning of steering wheel 38 in a positive left or right direction throttle valve 52 will be closed. After a turning operation in which piston 16 is moved a desired distance to the left or right, valve elements 34 and 36 will move to their neutral position. During the subsequent centering of piston 16 while the valve elements are in their neutral position, throttle valve 52 may be fully or only partially open depending on matters of design.

If the piston centering is from left to right, the presence of rod 17 causes chamber 20 to enlarge at a faster rate than chamber 22 decreases and chamber 20 can thus accommodate all of the fluid displaced from chamber 22 through metering motor 40. In that case the exhausting of all or none of the fluid in line 42 to tank 30 through throttle valve 52 is of little importance.

If the piston centering is from right to left, and assuming the absence of throttle valve 52, the presence of rod 17 would cause more fluid to be displaced from chamber 20 than could be accepted by chamber 22 through metering motor 40 and the excess would have to be somehow expelled through leakage points in the system.

If the piston centering is from right to left and throttle valve 52 is present, a quantity of fluid leaving chamber 20 may be exhausted to tank 30 through throttle valve 52 if valve 52 is fully open. On the other hand, a predetermined opening for throttle valve 52 can be selected wherein the centering of piston 16 to the left causes a quantity of fluid to flow from chamber 20 which is thereafter divided with a portion thereof being drained through throttle valve 52 and the remaining being directed to the opposite chamber 22 through motor 40.

The opening for throttle valve 52 can thus be selected in each case so that the centering of piston 16 from the left or the right results in the same quantity of fluid being directed through motor 40 and the automatic centering will thus be equal relative to both sides.

If desired a valve arrangement similar to throttle valve 52 may be connected to line 45 to drain chamber 22 directly to tank 30 but the advantage of doing so would not be nearly as great as that gained by utilizing throttle valve 52 as described above.

I claim:

1. A hydraulic steering control system comprising, a bidirectional differential type servomotor having rod side and non-rod side operating ports on opposite sides thereof, pump and tank means, manually operable steering control means, a reaction type metering control unit having a housing, metering motor means in said housing, first and second relatively rotatable control valve means connected respectively to said steering control means and said metering motor means, spring means between said first and second control valve means, said housing having a supply port connected to said pump means and an exhaust port connected to said tank means, said housing having first and second control ports connected respectively to said rod and non-rod side servomotor operating ports, flow path means determined by said steering control means and controlled by said valve means for directing supply fluid from said supply port through said metering motor means to either of said control port connections and directing exhaust fluid from the other of said control port connections to said tank means, said flow path means including exhaust valve throttle means in passage means between said non-rod side servomotor port and said tank means controlled by said control valve means to be (1) open when said control valve means is in a neutral position to exhaust fluid from said non-rod side thereof to said tank means during centering of said servomotor towards said non-rod side and (2closed while supply fluid is being directed to either side of said servomotor.

2. A hydraulic steering control system according to claim 1 wherein said exhaust valve throttle means is internally of said steering control means between said housing second control port and said housing exhaust port.

* * * * *